United States Patent
Khambatkone et al.

(10) Patent No.: US 7,023,793 B2
(45) Date of Patent: Apr. 4, 2006

(54) RESILIENCY OF CONTROL CHANNELS IN A COMMUNICATIONS NETWORK

(75) Inventors: Alok Khambatkone, Santa Clara, CA (US); Sivaramakrishna Kuditipudi, San Jose, CA (US); Lei Fu, San Jose, CA (US); Premal Dinesh Desai, San Jose, CA (US); Neeraj Gulati, Cupertino, CA (US); Murtuza Attarwala, Sunnyvale, CA (US)

(73) Assignee: CIENA Corporation, Linthicum, MD (US)

( * ) Notice: Subject to any disclaimer, the term of this patent is extended or adjusted under 35 U.S.C. 154(b) by 0 days.

(21) Appl. No.: 10/898,626

(22) Filed: Jul. 26, 2004

(65) Prior Publication Data

US 2005/0025046 A1 Feb. 3, 2005

Related U.S. Application Data

(60) Provisional application No. 60/491,533, filed on Aug. 1, 2003.

(51) Int. Cl.
*H04J 1/16* (2006.01)
(52) U.S. Cl. ............. 370/218; 370/225; 370/238; 709/239
(58) Field of Classification Search ............ 370/228, 370/238, 352, 400, 248, 255, 401, 359, 386, 370/430, 218, 225, 219; 709/223, 238–244, 709/233; 340/172.5; 710/317; 385/16; 714/47; 398/1–8, 9, 14, 17; 235/153; 713/200
See application file for complete search history.

(56) References Cited

U.S. PATENT DOCUMENTS

| | | | | |
|---|---|---|---|---|
| 5,274,782 A | * | 12/1993 | Chalasani et al. | 710/317 |
| 6,163,527 A | * | 12/2000 | Ester et al. | 370/228 |
| 6,725,401 B1 | * | 4/2004 | Lindhorst-Ko | 714/47 |
| 2002/0080437 A1 | * | 6/2002 | Sparks et al. | 359/110 |
| 2003/0043736 A1 | * | 3/2003 | Gonda | 370/218 |
| 2003/0163555 A1 | * | 8/2003 | Battou et al. | 709/223 |

FOREIGN PATENT DOCUMENTS

WO   WO 00/52890   9/2000

\* cited by examiner

*Primary Examiner*—John Pezzlo
(74) *Attorney, Agent, or Firm*—Dougherty Clements; Christopher L. Bernard; Tyler S. Brown (57) ABSTRACT

Lines within an aggregated link extending between network elements in a communications system are monitored for faults. Once a fault is detected on a particular line carrying a control channel, an alternative line is selected and control channel is transmitted on the alternative line. Once a control channel is received at a remote end on a new line, the control channel is reassigned to that line. In an alternative embodiment, the control channel is split into separate channels carrying routing and signaling information, respectively. The separate routing and signaling channels are carried by separate lines, but can be reassigned to other lines in response to a fault. Further, the routing information can be carried by multiple lines in an alternating pattern such as a round robin fashion.

28 Claims, 8 Drawing Sheets

RESILIENCY OF CONTROL CHANNELS IN A COMMUNICATIONS NETWORK

CROSS-REFERENCE TO RELATED APPLICATIONS

This application claims priority under 35 U.S.C. § 119(e) on U.S. Provisional Patent Application No. 60/491,533 filed on Aug. 1, 2003. The disclosure of which is incorporated herein by reference in its entirety.

BACKGROUND OF THE INVENTION

In current large-scale networks, information flows through a series of nodes in the network from one location or site to another. As the network grows, more and more transmission lines may be added to handle the heavy traffic flow between nodes. Network switches are used to connect one transmission line to another and to manage information flow through a network. As networks increase in size and complexity, more switches and transmission lines are added. An example of such a network switch is the "MultiWave CoreDirector" switch, manufactured and distributed by CIENA Corporation of Linthicum, Md.

Switches in large networks often store link connectivity information about other switches. Such network topology information is often useful when a fault is detected. In particular, if a transmission line becomes defective, network topology information distributed among various switches in the network can be used to reroute data flow around the fault. Each switch then typically broadcasts to other switches in the network a new network topology. Such information is broadcast for each transmission line. In networks having many transmission lines and switches, however, distribution of topology information can be cumbersome and inefficient. For example, if multiple transmission lines connect the same switches, the same topology information may be unnecessarily duplicated for each transmission line. Accordingly, so-called aggregated links have been proposed in which multiple transmission lines interconnecting the same switches or network elements are treated as a single link. Thus, corresponding topology information of the aggregated links is shared among various switches in the network, as opposed to numerous copies of the same information for individual lines within the aggregated link. Aggregated links are discussed in greater detail in U.S. patent application Ser. No. 10/061,995 titled "Link Aggregation", filed Feb. 1, 2002.

A particular channel is often used to carry topology information between two network elements or switches on a line within an aggregated link, if the line becomes faulty, however, the control channel maybe disrupted, thereby hindering adequate network monitoring.

SUMMARY OF THE INVENTION

Exemplary embodiments of the invention include a communication method and apparatus to detect a fault on a first line carrying a control channel from a first network element to a second network element, wherein the first line is a line in an aggregated link between the first network element and the second network element; to assign the control channel to a second line at the first network element, wherein the second line is a line in the aggregated link; to detect control information transmitted on the control channel of the second line at the second network element; and to assign the control channel to the second line upon detection of the control information at the second network element.

Other exemplary embodiments include a communication method and apparatus to transmit routing information on alternating lines selected from a plurality of lines in an aggregated link between a first network element and a second network element.

Further scope of applicability of the present invention will become apparent from the detailed description given hereinafter. However, it should be understood that the detailed description and specific examples are given by way of illustration only, since various changes and modifications within the spirit and scope of the invention will become apparent to those skilled in the art from this detailed description.

BRIEF DESCRIPTION OF THE DRAWINGS

Advantages of the present invention will be apparent from the following detailed description of the preferred embodiments thereof, which description should be considered in conjunction with the accompanying drawings in which.

DETAILED DESCRIPTION

Aspects of the invention are disclosed in the following description and related drawings directed to specific embodiments of the invention. Alternate embodiments may be devised without departing from the spirit or the scope of the invention. Additionally, well-known elements of the invention will not be described in detail or will be omitted so as not to obscure the relevant details of the invention.

In describing the embodiments below, reference will be made to Optical Signaling and Routing Protocol (OSRP), which is developed and distributed by CIENA Corporation and described in more detail in U.S. patent application Ser. No.: 09/259,263 filed Mar. 1, 1999, entitled "Routing and Signaling in a SONET Network", which is herein incorporated by reference in its entirety. OSRP is a distributed protocol designed for controlling a network of optical crossconnects (OXCs). OSRP introduces intelligence in the control plane of the optical transport system. It can perform many functions such as automatic resource discovery, distributing network resource information, and establishing and restoring connections dynamically across the network. Accordingly, OSRP links and lines refer to links and lines operating under OSRP.

Further, in describing the embodiments below a link can be considered a connection between nodes and a line generally represents elements in the data path (e.g., one or more physical lines) that carries the information between nodes or network elements. Further, a link typically refers to an aggregated link, which includes a plurality of lines, and is discussed in detail in previously cited U.S. patent application Ser. No. 10/061,995 titled "Link Aggregation", filed Feb. 1, 2002, the disclosure of which is incorporated by reference herein in its entirety. Accordingly, the lines will typically be aggregated to allow multiple parallel lines between nodes or network elements (NEs) to be represented as one link or a reduced number of links.

In accordance with at least one embodiment of the invention, lines within an aggregated link extending between nodes or network elements (NEs) in a communications system are monitored for faults. Once a fault is detected on a particular line (e.g., an OSRP line), other lines can be used to transmit information and to maintain the integrity of the link. For example, when a fault is detected at a local network element, the local network element reassigns the control channel to another available line within the aggregated link and transmits the control information on the new line. When control information is first received on a new line at the remote network element, the line supplying the data is identified, and the control channel is reassigned to that line. This ability to reassign the control channel takes advantage of the multiple lines in an aggregated link and was not available in prior art systems. Therefore, the loss of a line carrying the control channel can be overcome and the integrity of the link maintained.

Further, in at least one embodiment, the control channel can be split into separate channels carrying routing and signaling information, respectively. The separate routing and signaling channels can be carried by separate lines, but can be reassigned to other lines in response to a fault as discussed above. Further, multiple lines can carry the routing information. For example, the routing information can be distributed over the multiple lines in a round robin fashion to balance the routing information/packets, to insure reliable transmission and reduce the likelihood of disruption.

Figure 1:
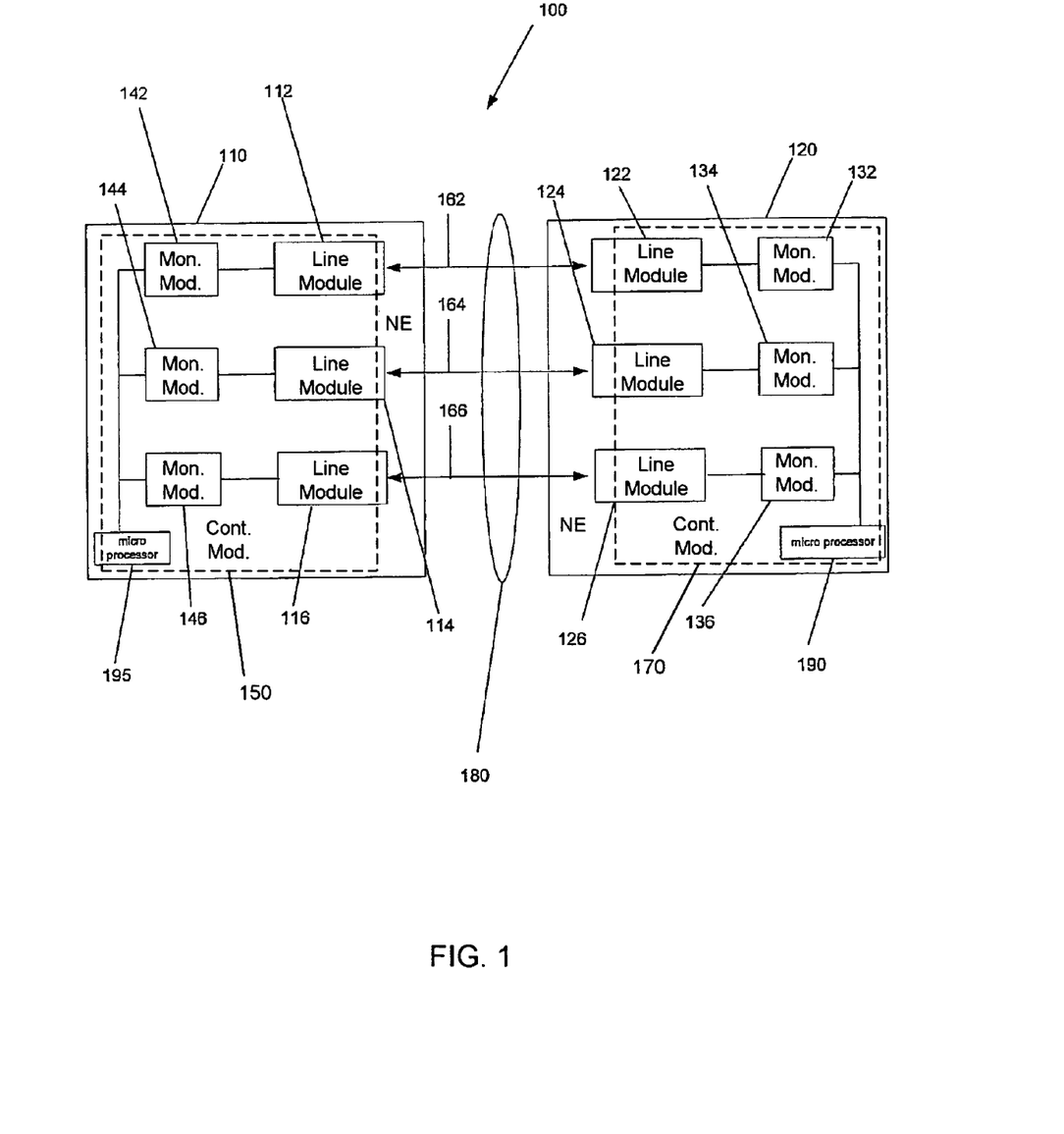
FIG. 1 illustrates a portion of a network in connection with at least one embodiment of the invention.

Referring to the drawings in which like reference characters indicate the same or similar elements in each of the several views, FIG. 1 illustrates a portion 100 of a network including two network elements 110 and 120. Network element 110 includes a plurality of line modules 112, 114 and 116 coupled to lines 162, 164 and 166, respectively. Each of line modules 112, 114 and 116 can include conventional optical and electrical components to supply optical signals to and receive optical signals from lines 162, 164 and 166, respectively. Each of lines 162, 164 and 166 can include one or more optical fibers (e.g., a pair of optical fibers). Collectively, lines 162, 164 and 166 can constitute an aggregated link 180.

The second network element 120 can include line modules 122, 124 and 126, respectively coupled to lines 162, 164 and 166. Each of line modules 122, 124 and 126 can supply signals (e.g., optical signals) to these lines for transmission to corresponding line modules in network element 110, as well as receive optical signals from network element 110 over the lines 162, 164 and 166. Monitoring modules 132, 134 and 136 can be provided to monitor line modules 122, 124 and 126, respectively. Alternatively, a single monitor module can monitor multiple line modules. Each of these monitoring modules can include a conventional microprocessor (or multiple processors) running suitable software to carryout monitoring of the line modules and detection of faults in the line modules themselves or in one of lines 162, 164 and 166. Alternatively, a single microprocessor 190 can be provided that runs multiple software routines for respectively monitoring outputs from monitoring modules 132, 134 and 136 and/or for monitoring line modules 122, 124 and 126. Microprocessor 190 can execute additional software for overseeing the individual routines and selecting an alternative line for carrying a control channel, which is described in greater detail below.

As further shown in FIG. 1, monitoring modules 142, 144 and 146, similar to those monitoring modules found in network element 120, can be provided for monitoring corresponding line modules 112, 114 and 116. One or more microprocessors can be provided within each monitoring module 142, 144, and 146, as described above in connection with monitoring modules 132, 134 and 136. Alternatively, a single microprocessor 195 similar in function and operating characteristics as microprocessor 190 can be provided running similar subroutines and observer software as discussed above.

Those skilled in the art will appreciate that the functionality of the various modules discussed above in regard to FIG. 1 can be realized generally as a control module 150, 170, which can integrate some or all the functions (e.g., monitoring modules, logic of line modules, and the like) into one common module. Further, since the functionality of the various modules can be achieved in various forms (e.g., software routines, specialized logic circuits, and the like and combinations thereof, the specific illustrations are not to be taken as a limiting configuration and instead are merely provided as a tool for illustration of embodiments of the invention.

One of line modules 112, 114 and 116, for example, can generate a control channel, which can take the form of a time division multiplexed (TDM) signal, a particular wavelength in a wavelength division multiplexed (WDM) signal or a dense wavelength division multiplexed (DWDM) signal, and the like. The control channel can carry network topology information, as well as other monitoring and/or diagnostic information related to network elements 110 and 120 or any other element(s) in the network 100 in which network elements 110 and 120 are located. The control channel can also carry routing and signaling information between network elements 110 and 120. For example, routing information can be used by network elements to advertise capacity on lines and links in a network, can be used to calculate a shortest path between different points in a network and the like. Signaling information can be used to configured network elements, set up and tear down connections between switches or network elements in a network, and the like.

Numerous mechanisms for conveying control channel information are contemplated by embodiments of the invention, e.g., an optical service channel, a Synchronous Optical Network (SONET), a Synchronous Digital Hierarchy (SDH) system, and the like. However, the invention will be described by reference to a signal conforming to SONET, which includes transmitting such control channel information by using bytes present in the signal.

Figure 2:
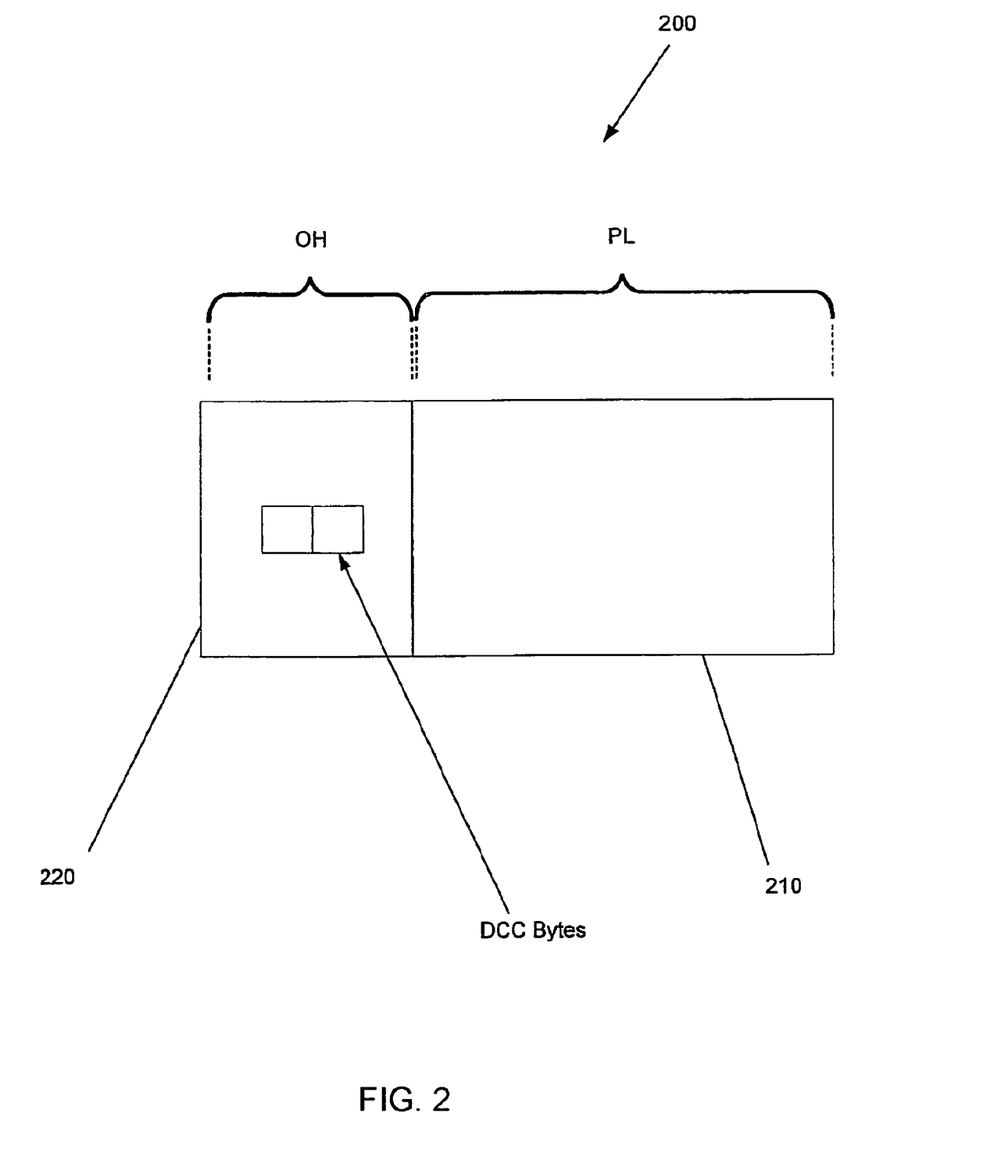
FIG. 2 illustrates a SONET frame having DCC bytes for carrying control channel information consistent with at least one embodiment of the invention.

FIG. 2 illustrates a graphical representation of a SONET frame 200 having a payload (PL) section 210, carrying information to be transmitted through a network, and an overhead (OH) section 220 carrying overhead information (e.g., error monitoring bytes and the like). Selected bytes within the OH section, known as data communications channel (DCC) bytes, can be encoded with control channel information and transmitted from network element 110 to network element 120, for example, using conventional SONET equipment.

Figure 3:
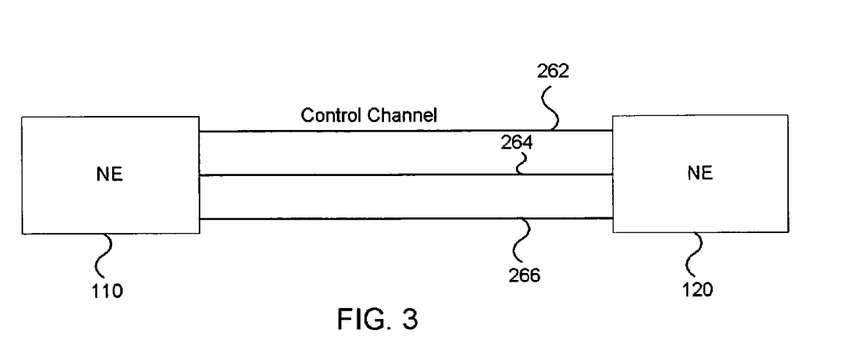
FIGS. 3–5 illustrate control channel transmission over different lines in accordance with at least one embodiment of the invention.
Figure 4:
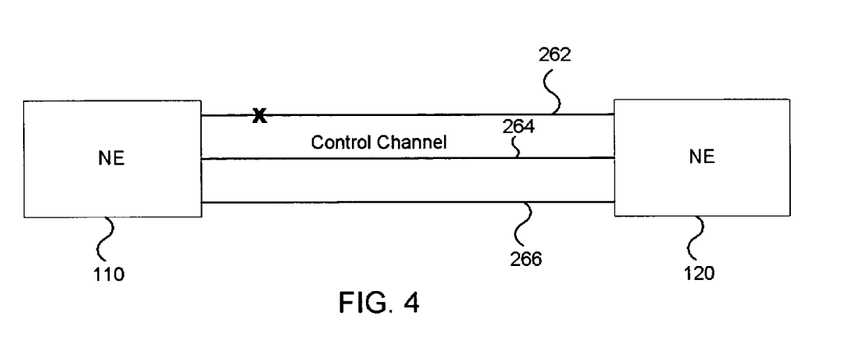
Figure 5:
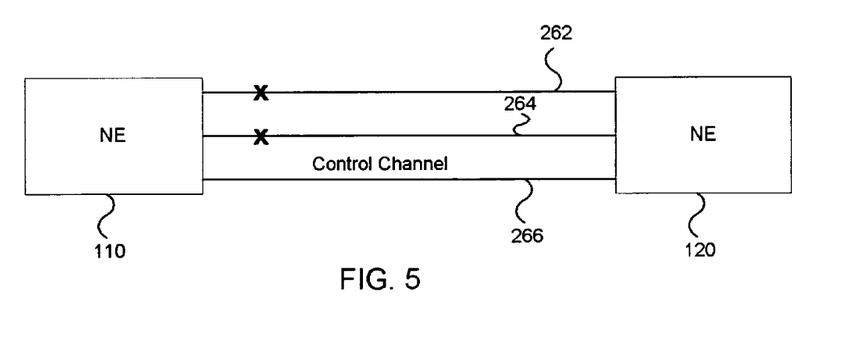

At least one embodiment of the invention will now be described with reference to FIGS. 3–5. Referring to FIGS. 3–5, a simplified view of network elements 110 and 120, interconnected by lines 262, 264 and 266 are illustrated. For purposes of illustration a line and line fault described below can include line modules, physical lines, and the like. In FIG. 3, a control channel is assigned to line 262 and line 262 can be used until a fault is detected in the line.

Referring to FIG. 4, in the event of a fault (e.g., as indicated by an "X") in line 262 monitoring circuitry and/or software in network element 120 can detect the presence of the fault on line 262. The control channel can than be reassigned to another available line (e.g., 264) in the aggregated link at the local network element 120 (e.g., the network element that first detected the fault). The control information is then transmitted on the new line 264 to the remote network element 110. In the illustrated example, incoming control information is first sensed on line 264, at network element 110. Network element 110 thus identifies line 264 in response to such sensed information, and subsequently the control channel is assigned to line 264 to communicate between network elements 110 and 120.

In FIG. 5, it is assumed that both lines 262 and 264 are down (e.g., a physical line or line module fault, and the like). Accordingly, the local network element (e.g., 120) selects available line 266 to transmit the control information. In response to incoming control information on line 266, the remote network element (e.g., 110) establishes line 266 as the control channel. Subsequently, line 266 serves as the control channel between network elements 110 and 120.

Moreover, in the examples shown in FIGS. 3–5, network element 120 can send status information indicating the presence of a fault, as well as identifying any defective lines (e.g., 262 and 264). For example, this information can be transmitted along the control channel to network element 110 from network element 120. Upon receipt of the status information, network element 110 can store a map or network topology information indicating that the fault is associated with a line or lines (e.g., 262 and 264), and that an alternate line (e.g., 266) is available for carrying the control channel, which is described in greater detail below.

Figure 6:
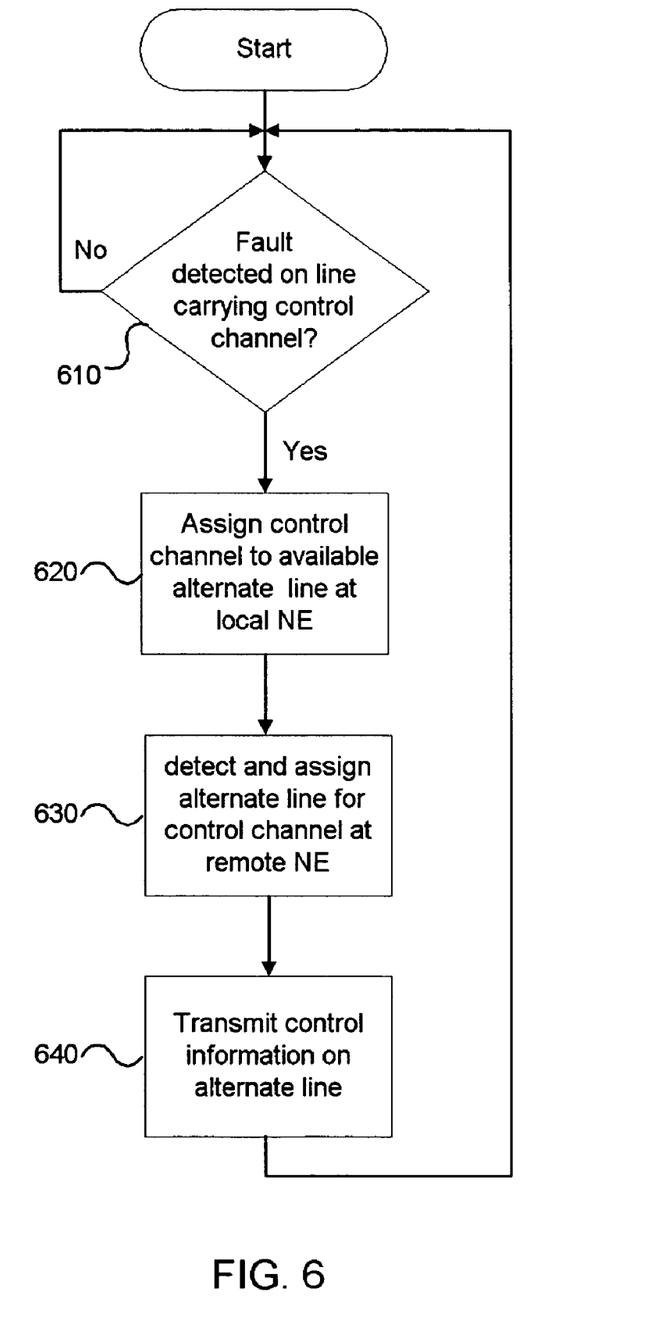
FIG. 6 illustrates a flow chart of a communication method in accordance with at least one embodiment of the invention.

FIG. 6 is a flow chart illustrating a method in accordance with at least one embodiment of the invention. For purposes of example only, the method shown in FIG. 6 will be discussed in connection with FIGS. 1–5. In block 610 of the flowchart, a determination is made as to whether a fault is detected on a line carrying a control channel between network elements 110 and 120. If no fault is detected, monitoring continues. However, if a fault is detected by monitoring circuitry and/or software (e.g., a monitor module) in a network element 120, other lines can be evaluated to determine which one(s) is/are available (e.g., no faults detected, no alarms, and the like) to serve as the control channel and transmit control information. For example, assuming the fault is detected at a local network element (e.g., 120), the control channel can be assigned to an available line at the local network element 120, as illustrated in block 620. Network element 120 can then transmit control information from local network element 120 to remote network element 110 on the new line. Network element 110 detects the control information on the new line and then can assign the control channel to the new line, as illustrated in block 630. Thereafter, network elements 110 and 120 transmit and receive the control information over the new line, as illustrated in block 640. The process can return to block 610, where the new line is monitored for faults.

Accordingly, an embodiment of the invention can include a communication method wherein a fault is detected on a first line carrying a control channel from a first network element to a second network element. The first line can be part of an aggregated link between the first network element and the second network element. The control channel can then be assigned to a second line. The second line is also part of the aggregated link. Control information transmitted via the control channel on the second line can be detected at the second network element and the control channel can be assigned to the second line upon receipt of the control information at the second network element.

As noted above, the control channel can carry both routing and signaling information. The routing and signaling information can be in accordance with various protocols including Optical Signaling and Routing Protocol (OSRP). Likewise, SONET compliant signals can be transmitted between the first and second network elements. The SONET compliant signals can include a plurality of frames. Each frame can have a data communications channel (DCC) section, as discussed in reference to FIG. 2, and the control information associated with the control channel can be transmitted in the data communications channel section.

In the embodiments discussed above, the routing and signaling information can be supplied to the same line. In accordance with at least one embodiment of the invention, however, the routing and signaling information can be carried over separate lines. Additionally, the routing information can be distributed over a plurality of lines in the aggregated link. However, those skilled in the art will appreciate that splitting the routing and signaling information can cause delays in sensing a failure on one particular line (e.g., the signaling line) in the aggregated link. For example, if a signaling line goes down (e.g., DCC blocked), the routing channel(s) may still be up and the link may still be advertised as active. Accordingly, the timing of the fault detection scheme (e.g., inactivity timers, and the like) can be reduced so that faults in the lines (e.g, signaling line) can be detected more rapidly to avoid excessive crank backs and to reassign the control channel to maintain the link.

Further, status information can be stored at the first network element identifying the fault on the first line (or other lines). The status information indicating the fault on the first line can be transmitted to and stored at the second network element the status information. The status information can be stored in a variety of formats including a map, a table and/or a database indicating the status of the lines in the aggregated link. These aspects are discussed in greater detail in the following description.

Figure 7:
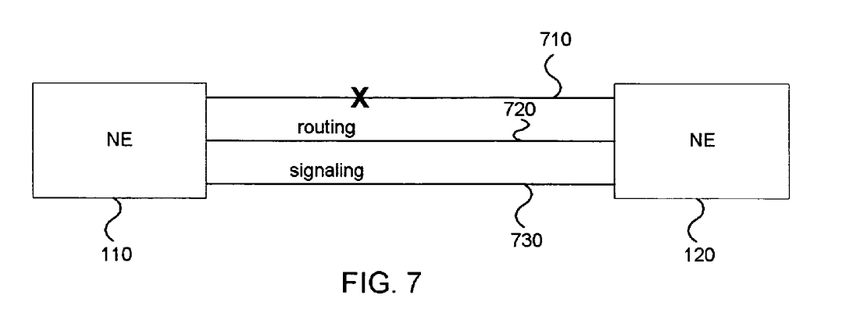
FIGS. 7–8 illustrate transmission of routing and signaling information over separate lines in accordance with at least one embodiment of the invention.

FIG. 7 illustrates an embodiment of the invention where the routing and signaling information is transmitted on different lines. In referring to FIG. 7, signaling information associated with an aggregated link can be initially transmitted from network element 110 to network element 120 over line 710, while routing packets associated with the aggregated link can be transmitted on line 720. In the event of a fault (indicated as an X) on line 710, the fault can be detected and further signaling information can be transmitted on line 730 from network element 110 to network element 120 in response to the fault detection. Accordingly, the control channel having the signaling information can be reassigned in a manner similar to that described above with reference to FIG. 6.

Figure 8:
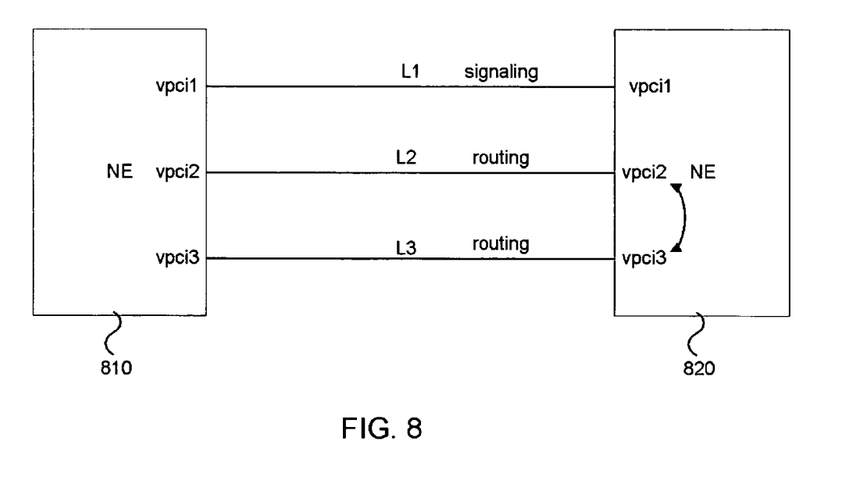

FIG. 8 illustrates an embodiment similar to FIG. 7, in that signaling information can be supplied on a single line within an aggregated link. However, if two or more lines are available within an aggregated link then one (e.g., line L1) can be used to transmit signaling information (e.g., packets) and the remaining lines (or a portion of the remaining lines) can be used for routing information (e.g., packets). For example, routing packets can be sent on lines L2 and L3 in an alternating pattern (e.g., a round robin pattern, randomized pattern, and the like) to balance the loading of the lines. If L3 goes down, then L2 can be used to send routing packets. However, if L2 goes down, then L1 will be used for both signaling and routing packets. Those skilled in the art will appreciate that many variations are also within the scope of embodiments of the invention. For example, the signaling line can be used for routing on an infrequent basis for load balance (e.g., one out of every ten cycles of the round robin process could use the signaling line for routing). Further, the signaling information can also be alternated between lines within the link.

Those skilled in the art will appreciate that various scenarios can cause a line to go down (i.e., be considered unusable for signaling and routing). For example, referring to FIG. 8, if L2's line module is rebooting at network element 820, then 820 can use L1 for both routing and signaling packets. However, network element 810 still thinks L1 and L2 are good. Therefore, network element 810 will keep sending signaling packets on L1 and routing packets on L2. The routing packets sent might be lost and the hello-link can fail.

Accordingly, status information can be established to communicate the line state information from each network element (e.g., 810 and 820). The status information can be transmitted in a variety of formats, such as, single line state information, portions, or a complete map (table, database) containing line state information. The communication can be triggered on any event that triggers a change in the line state availability for routing or signaling (e.g., a LM reboot). Further, a portion (e.g., the status of the line related to the event trigger) of the stored status information of line states in the network element can be transmitted to and/or updated at a remote network element. Each network element (810, 820) can maintain a local map as well as a remote map identifying the lines and which lines are available for sending information (e.g., routing/signaling packets). A Virtual Path Connection ID (VPCI) is an example of a system used as a common identification for a line at both ends (e.g., 810, 820) and will be used in the description for purposes of illustration only and not limitation as other line identifying systems can be used.

Generally, if both local and remote states for a line indicate the line is good, the line can be used to send and receive information (e.g., routing/signaling packets). A line can be considered to be good locally when it is available for transmitting/receiving information at a network element. Those skilled in the art will appreciate that many factors can be used to determine whether a line is good or available including but not limited to at least one of: the line being up; the line being unlocked; no alarms on the line; and no alarms on the interface containing the line. Accordingly, each local end or local network element can obtain the state of the lines at that local end.

However, it can also be desirable to obtain information about a remote end or network element. Accordingly, status information (e.g., a transmit (Tx) packet) can be sent on a trigger that causes a fault on one of the lines (e.g., line module reboot, physical line failure, and the like). The status information (Tx packet) can contain the local line identifier (e.g., VPCI) map of lines of a given interface/network element. Upon receiving this status information, the remote network element can update its remote map (e.g., VPCI map). Further, the remote network element can send back an acknowledge message (Ack) to this status information (Tx packet). The Ack can contain the local map of the remote network element. On receiving an Ack packet back or status information from the remote network element, the local network element can update its remote map. The status information (e.g., Tx and Ack packets) can be sent on the current signaling line. Tx and Ack packets will be used below in the description to represent transmitting status information between network elements. However, the invention is not limited to this format and it is used solely for the purposes of illustration.

As discussed above, status information can be sent when there is a change of state of a line in the network element or interface. For example, a Tx packet can be sent on a line up event that declares the line is available for routing/signaling (e.g., after successful reboot of a LM). Additionally, a Tx packet can be sent on a line down event that declares the line is unavailable for routing/signaling (e.g., LM is rebooting, line fault, alarm, and the like). Examples of alarms can include line alarms such as admin state mismatch, remote unreachable, and VPCI mismatch for which the line is declared unavailable for routing/signaling. Other examples of alarms can include an interface/network element mismatch for which all lines in network element are declared as unavailable for routing/signaling.

Figure 9:
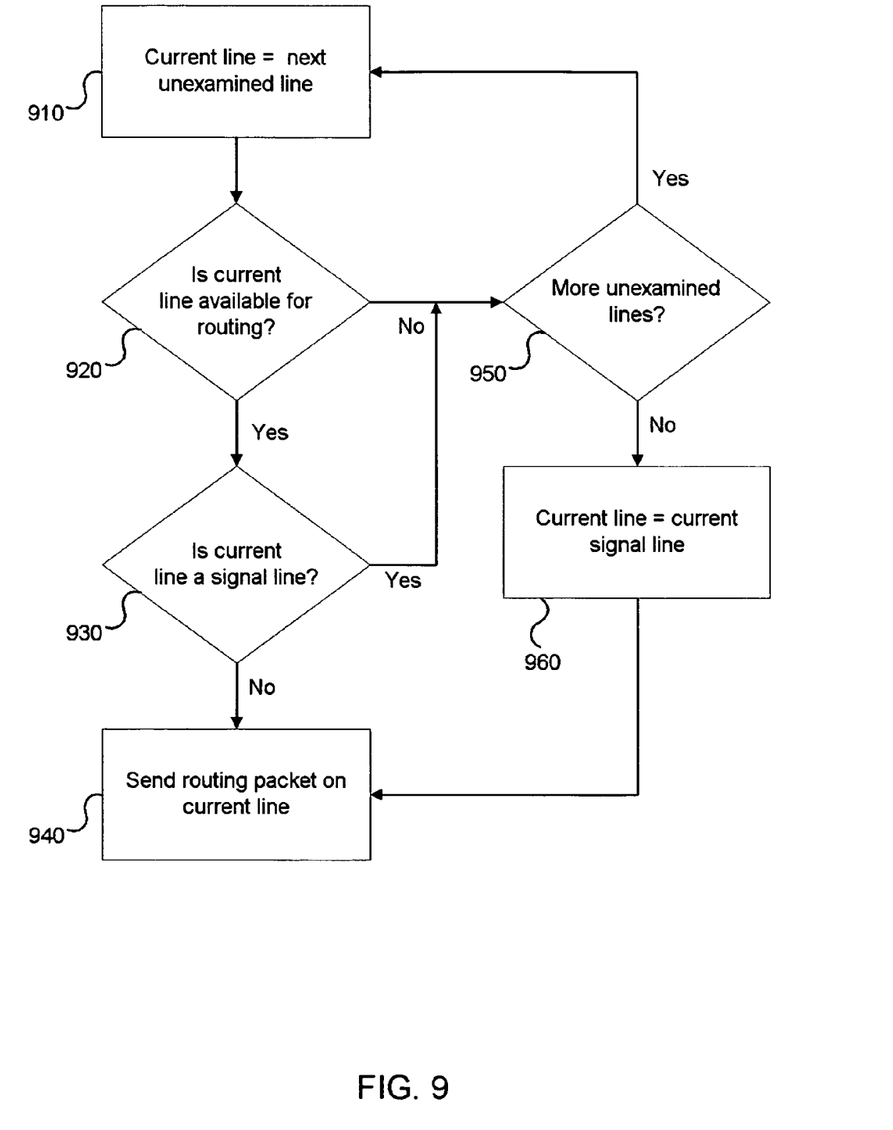
FIG. 9 illustrates a flow chart of a communication method in accordance with at least one embodiment of the invention.
Figure 10:
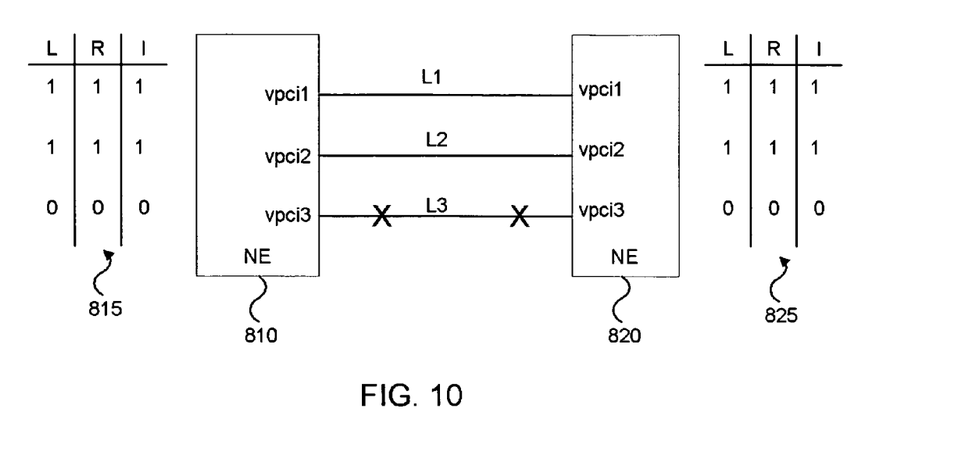
FIGS. 10–14 illustrate examples of updating status information for local and remote network elements.

Referring to FIG. 9, a flowchart illustrating a method according to at least one embodiment of the invention is shown. Accordingly at least one embodiment of the invention includes transmitting routing information on alternating lines selected from a plurality of lines in an aggregated link. For example, the alternating lines can be selected according to the process illustrated in FIG. 9. As illustrated in block 910, the current line is established as a next unexamined line in the interface/network element. The current line is then checked to see if it is available for routing in block 920. For example, the stored status information (e.g., map, table, database) of the lines can be accessed to determine whether the current line is available for routing, as discussed above.

The next unexamined line can be selected using a variety of techniques. For example, in the round robin process discussed above, the next unexamined line can be the next sequential line in the aggregated link. Accordingly, assuming the aggregated link has five lines, L1–L5, the round robin process would consider the next unexamined line to be the next sequential line. Therefore, if L4 is currently used for routing, then the next unexamined line would be L5. The remaining unexamined lines would be lines L1–L4, which could be accessed if L5 is unavailable for routing. However, the invention is not limited to sequentially examining the available lines, and many variations will be appreciated by those skilled in the art. For example, a next unexamined line can be selected randomly from remaining unexamined lines and the like.

Optionally, a further check of the current line can be made to see if it is a line currently used for signaling, if the signaling line is not typically used for routing, as illustrated in block 930. Further, the signaling line can be excluded from a list of unexamined lines, so that an additional check would not be necessary. If the current line is available for routing (block 920) and optionally not a signaling line (block 930), then the routing packet is sent on the current line in block 940.

Alternatively, if the current line is not available for routing or if optionally the current routing line is a signaling line, the current line is rejected and the process checks if there are more unexamined lines in the aggregated link, in block 950. If there are additional unexamined lines, then the process returns to block 910 and establishes the next unexamined line as a new current line. However, if there are no more unexamined lines (including the line previously used for routing), the signaling line is used as the routing line as illustrated in block 960.

For example, referring to FIG. 8, if line L1 is used for signaling and lines L2 and L3 can be used for routing, then if all lines are available (e.g., fault free) L1 can be used for signaling and the routing packets can be alternated between L2 and L3. If L3 becomes unavailable, then L1 can be used for signaling and L2 can be used for routing information. When the process tries to establish L1 as the current routing line, it can be rejected because it is a signaling line (e.g., block 930 of FIG. 9). Then, L2 can be indicated as a next unexamined line and L2 can be established as the current routing line and the routing packets will be sent on L2. If L2 also becomes unavailable, then a negative result (e.g., in block 920) can lead to block 950 to check for more unexamined lines. Since there are no more unexamined lines in this example, the signaling line L1 can also be used for the routing line (e.g., block 960).

Those skilled in the art will appreciate that routing information can be supplied to selected lines in an alternating pattern (e.g., round robin fashion), as discussed above. Accordingly, even if multiple links go down, routing and signaling information can be exchanged between network elements and the resiliency of the communication network is improved. For example, the signaling information can be transmitted on a single line in the aggregated link. This line does not change unless there is a fault associated with the line and can be established as illustrated in FIG. 6. However, the routing information can be alternated between the remaining available lines (e.g., lines that are not the signaling line and are fault free) in the aggregated link as discussed with relation to FIG. 9.

Examples of various fault and clearing patterns are provided in connection with the discussion of FIGS. 10–14. For example, referring to FIG. 10, assuming L1 is used for signaling and L2 and L3 for routing in a round-robin fashion. If L3 goes down, it acts as a trigger for each network element 810 and 820. Network elements 810 and 820 can update their local maps 815 and 825, respectively. In the local maps illustrated in the figures, L represents the local state, R represents the remote state and I represents the intersection of the local and remote states. Assume Network elements 810 and 820 can send Tx packets to their respective remote ends on L1. When a Tx packets is received from a remote end, the respective remote state in a map (e.g., 815, 825) can be updated and an Ack packet can be sent back. After the exchange of information, both network elements 810 and 820 can use L1 for signaling and L2 for routing based on maps 815 and 825.

Figure 11:
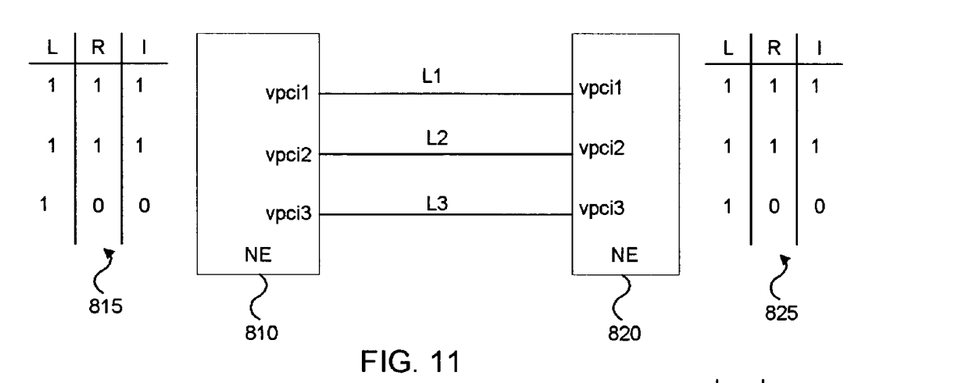
Figure 12:
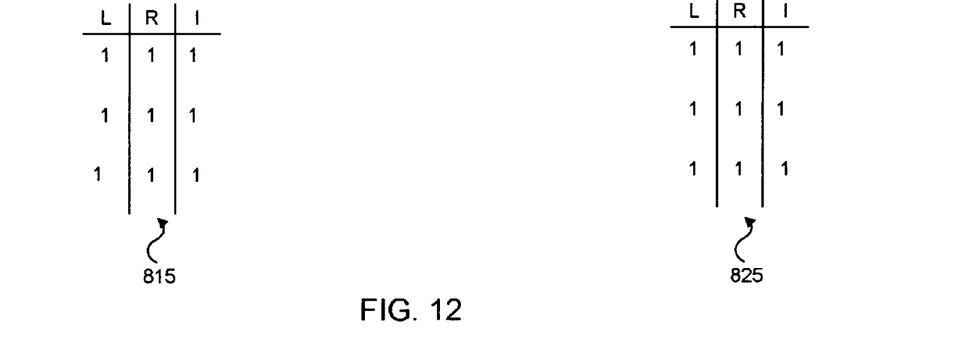

Referring to FIG. 11, maps 815 and 825 are illustrated when L3 comes back up (i.e., is available for routing). At the outset, both local values in the respective maps 815, 825 indicate that L3 is available and remote values have not been updated. Accordingly, the intersection of the local and remote state indicates that L3 is unavailable. Therefore, L3 will not be used for routing. FIG. 12 illustrates the state in maps 815 and 825 after Tx packets have been received. After the map is updated, the intersection (I) now indicates that the L3 is available for routing and routing packets can be sent on L3.

Figure 13:
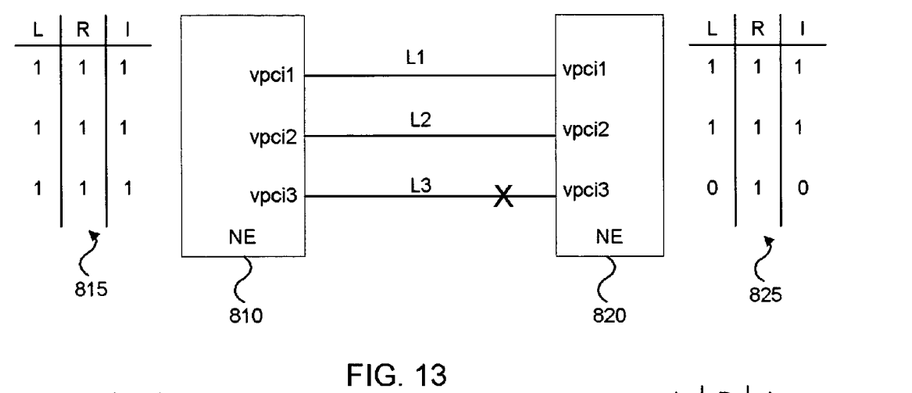
Figure 14:
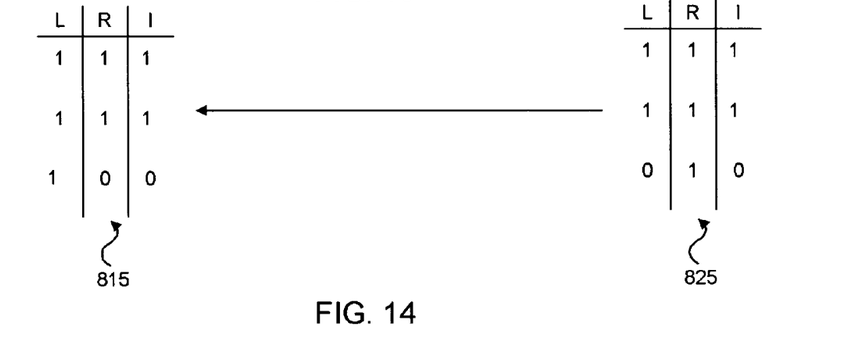

A further example is illustrated in FIGS. 13–14. For example, assume a line module reboot occurs on L3 at network element 820. The local map is updated to reflect that L3 at the local (L) level is unavailable. However, the remote end (810) is not yet aware of the fault, so map 815 still has L3 as being available at both the local (L) and remote (R) end. This event can trigger a Tx packet to be sent from network element 820 to network element 810 containing the line state information. FIG. 14 illustrates that upon receiving the Tx packet, the remote (R) value of L3 is updated to indicate L3 is unavailable and likewise the intersection (I) is updated to indicate L3 is unavailable for routing.

Those skilled in the art will appreciate that many other condition exist where either one end will know a line is unavailable or both ends will know a line is unavailable. However, in either case, since status information regarding the line status can be generated on any trigger event (e.g., LM reboot, line down, and the like), a remote network element can receive the status information, update its stored status information (e.g., map) and prevent/stop using any unavailable lines. Examples of triggers include but are not limited to remote unreachable alarm, admin. state alarm, interface mismatch alarm, VPCI mismatch alarm, and the like.

Figure 15:
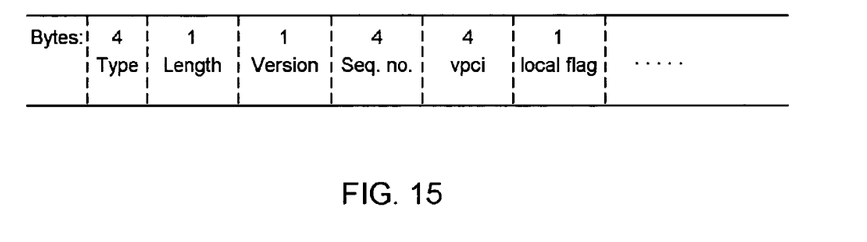
FIG. 15 illustrates a signal format according to at least one embodiment of the invention.

Referring to FIG. 15, an example of a signal format for status information in the form of a Tx/Ack packet is illustrated. A variety of fields can be used to communicate specific information types as are known by those skilled in the art. For example, a Type field can be four bytes and indicates whether the packet is a Tx or Ack packet. A sequence number field (seq. no.) can be four bytes. Sequence numbers can be used for retransmission requests of Tx packets and to drop out of sequence packets (e.g., for error correction, and improved reliability). The VPCI and local flag fields can be repeated for each line within the interface/network element so that the local map can be represented. The packets can be sent in the control channel. For example, the packets can be sent as bytes in the DCC as described in relation to FIG. 2.

The invention has been described in connection with a number of exemplary embodiments. To facilitate an understanding of embodiments of the invention, many aspects were described in terms of sequences of actions to be performed by elements of a processor/processing system. Those skilled in the art will recognize that in at least some embodiments, the various actions could be performed by specialized circuits (e.g., discrete logic gates interconnected to perform a specialized function, application specific integrated circuits (ASICS), and the like), by program instructions or computer program code being executed by one or more processors, or by any combination of the foregoing.

Moreover, embodiments of the invention can additionally be considered to be embodied entirely within any form of a computer readable storage medium having stored therein an appropriate set of program instructions/code that can cause a processor to carry out the techniques described herein. Thus, embodiments of the invention can be in tangible media, such as a floppy diskette, CD, DVD, hard drive, magnetic tape, memory or any other computer-readable storage medium, wherein, when the program instructions/code is loaded into and executed by a processor, the processor becomes an apparatus for practicing an embodiment of the invention. Additionally, embodiments of the invention can include program instructions as a data signal transmitted via a transmission medium, such as over electrical wiring or cabling, through fiber optics, or via electromagnetic radiation, wherein, when the computer program code is loaded into and executed by a processor, the processor becomes an apparatus for practicing the embodiments of the invention.

Accordingly, the various aspects of the invention may be embodied in many different forms, and all such forms are contemplated to be within the scope of embodiments of the invention. For each of the various aspects, any such form of an embodiment can be referred to herein as "logic configured to" or "module configured to" perform a described action.

Accordingly, embodiments of the invention include communication systems including logic/modules configured to perform the functions detailed in the foregoing description. For purposes of illustration, reference will be made to FIG. 1. A system according to at least one embodiment of the invention can include a first module configured to detect a fault on a line (e.g., 162) in an aggregated link (e.g., 180) carrying a control channel. The aggregated link includes a plurality of lines between a local network element (e.g., 110) and a remote network element (e.g., 120). A second module can be configured to assign the control channel to an alternate line (e.g., 164) in the aggregated link. The control channel is assigned to the alternate line, if the fault is first detect at the local network element (e.g., 110) or upon receipt of the control information from the remote network element (e.g., 120), if control information is detected on the alternate line. As noted above, the modules can have various embodiments including a network element (110, 120), a control module (150, 160), and a computer readable medium (e.g., program code on a CD, and the like). Additionally, the modules can be program instructions that form an extension of OSRP and can be functionally integrated into OSRP.

Further, the first and second modules discussed above can be integrated into a common module or form part of a single module (e.g., control module 150, 170), that can be part of a network element (e.g., 110, 120). Additionally, the functionality of the first and second modules can be further subdivided. For example, the first module configured to detect a fault could be subdivided into individual monitoring modules (e.g., 132, 134, and 136). Alternatively, the first and second modules can either wholly or in part reside in program instructions being executed by on or more processors (e.g., 190, 195) or in specialized circuits. Those skilled in the art will appreciate that the invention is not limited to any specific configuration of software and/or hardware and that all such forms are within the scope of the invention.

As noted above, the first and second modules can be integrated into a network element. Accordingly, at least one embodiment of the invention includes a first network element 110 and a second network element 120, each including first and second modules (e.g., the first and second modules can be integrated into control modules 150 and 170, respectively). Accordingly, each network element has the capability to detect failures on the line carrying the control channel, to reassign the control channel to an alternate line locally, and to detect the control information on an alternate line when received from a remote node and assign the control channel to that alternate line. Therefore, both network elements 110 and 120 coupled by aggregate link 180 can respond to local or remote line failures on the control channel by reassigning the control channel to an alternate line in the aggregated link. Thus, resiliency of the link between network elements 110 and 120 is enhanced.

Further, those skilled in the art will appreciate that the other functions/methods detailed in the foregoing description can be integrated into the previously describe modules/logic or can be realized as stand alone modules/logic. For example, additional modules can be configured to separate the signaling and routing information, alternate the routing information over a plurality of lines in the aggregated link, store and transmit line status information, and the like.

Therefore, at least one embodiment of the invention can include a communication system including a first module configured to transmit routing information on alternating lines selected from a plurality of lines in an aggregated link between a first network element and a second network element. The first module can include logic for selecting the alternating lines, including logic configured to establish a next unexamined line as a current line, wherein the next unexamined line is selected from the plurality of lines in the aggregated link; logic configured to determine if the current line is available for routing; and logic configured to sending routing information on the current line, if the current line is available for routing. As discussed above, the next unexamined line can be selected by a round robin process or from a random line selected from remaining unexamined lines.

Likewise, the first module configured to transmit routing information on alternating lines can be embodied in a variety of configurations, as discussed above in relation the modules configured to reassign the control channel. For example, the first module can be functionally integrated into Optical Signaling and Routing Protocol (OSRP). Further, the first module can form at least part of a network element, a control module and/or a computer readable media.

Additionally, the features of the two systems described above can be combined into a common system (e.g., a common control module, network element, and the like). The common system can have the signaling information transmitted on one line in an aggregated link and modules configured to reassign the signaling control channel in the event of a line fault. Additionally, the common system can have a module configured to transmit routing information over the plurality of remaining lines in the aggregated link as detailed in the foregoing description.

The foregoing description and accompanying drawings illustrate the principles, preferred embodiments and modes of operation of the invention. However, the invention should not be construed as being limited to the particular embodiments discussed above. Therefore, the above-described embodiments should be regarded as illustrative rather than restrictive. Accordingly, it should be appreciated that variations to those embodiments can be made by those skilled in the art without departing from the scope of the invention as defined by the following claims.

What is claimed is:

1. A communication method comprising:
   detecting a fault on a first line carrying a control channel from a first network element to a second network element, wherein the first line is a line in an aggregated link between the first network element and the second network element;
   assigning the control channel to a second line at the first network element, wherein the second line is a line in the aggregated link;
   detecting control information transmitted on the control channel of the second line at the second network element; and
   assigning the control channel to the second line upon detection of the control information at the second network element.

2. The method of claim 1, wherein the control channel includes at least one of signaling information and routing information.

3. The method of claim 2, wherein at least one of the signaling information and the routing information is in accordance with Optical Signaling and Routing Protocol (OSRP).

4. The method of claim 1, further comprising:
storing at the first network element status information identifying the fault on the first line.

5. The method of claim 4, further comprising:
transmitting the status information to said second network element; and storing at the second network element the status information indicating the fault on the first line.

6. The method of claim 5, wherein the status information is stored in at least one of a map, a table and a database.

7. The method of claim 1, further comprising:
transmitting SONET compliant signals between the first and second network elements, the SONET compliant signals comprising a plurality of frames, each frame having a data communications channel section, wherein information associated with the control channel is present in the data communications channel section.

8. The method of claim 1, further comprising:
transmitting signaling information on the first line in the aggregated link prior to the fault and on the second line after the fault; and
transmitting routing information on at least one additional line in the aggregated link.

9. The method of claim 8, further comprising:
transmitting routing information on alternating lines selected from a plurality of available lines in the aggregated link.

10. The method of claim 9, wherein the alternating lines are selected in at least one of a round robin process and a random pattern from available lines.

11. A communication method comprising:
transmitting routing information on alternating lines selected from a plurality of lines in an aggregated link between a first network element and a second network element,
wherein the alternating lines are selected by:
establishing an unexamined line as a current line, wherein the unexamined line is selected from the plurality of lines in the aggregated link;
determining if the current line is available for routing; and
sending routing information on the current line, if the current line is available for routing.

12. The method of claim 11, further comprising:
determining the current line is not available for routing if the current line is a signaling line.

13. The method of claim 11, wherein determining if the current line is available for routing comprises:
determining the current line is not available for routing if the current line has an associated fault condition.

14. The method of claim 13, wherein the associated fault condition is determined by:
accessing status information to determine if the current line is available for routing.

15. The method of claim 14, wherein the status information is stored in at least one of a map, a table, and a database.

16. The method of claim 15, wherein the stored status information comprises local line status and remote line status for the plurality of lines the aggregated link.

17. The method of claim 11, further comprising:
determining if there is an additional unexamined line, if the current line is unavailable;
repeating the method of claim 11, if there is the additional unexamined line; and
establishing a signaling line as the current line and transmitting routing information on the current line, if there is no additional unexamined line.

18. The method of claim 11, wherein the unexamined line is selected from the plurality of lines in the aggregated link by a round robin process.

19. The method of claim 11, wherein the unexamined line is selected from the plurality of lines in the aggregated link by a randomly selecting the unexamined line.

20. A communication system comprising:
a first module configured to detect a fault on a line an aggregated link carrying a control channel, wherein the aggregated link includes a plurality of lines between a local network element and a remote network element; and
a second module configured to assign the control channel to an alternate line in the aggregated link, wherein the control channel is assigned to the alternate line, if the fault is first detect at the local network element and wherein the control channel is assigned to the alternate line, upon receipt of the control information from the remote network element, if control information is detected on the alternate line.

21. The system of claim 20, wherein at least one of the first and second modules forms at least part of at least one of a network element, a control module, and a computer readable media.

22. The system of claim 20, wherein at least one of the first and second modules is functionally integrated into Optical Signaling and Routing Protocol (OSRP).

23. The system of claim 20, wherein the local network element and the remote network element each comprise first and second modules.

24. The system of claim 20, further comprising:
a third module configured to store status information identifying the fault on the line; and
a fourth module configured to transmit the status information to the remote network element.

25. A communication system comprising:
a first module configured to transmit routing information on alternating lines selected from a plurality of lines in an aggregated link between a first network element and a second network element,
wherein the first module comprises logic for selecting the alternating lines including:
logic configured to establish an unexamined line as a current line, wherein the unexamined line is selected from the plurality of lines in the aggregated link;
logic configured to determine if the current line is available for routing; and
logic configured to sending routing information on the current line, if the current line is available for routing.

26. The system of claim 25, wherein the unexamined line is selected by at least one of a round robin process and randomly selecting the unexamined line.

27. The system of claim 25, wherein the first module is functionally integrated into Optical Signaling and Routing Protocol (OSRP).

28. The system of claim 25, wherein the first module forms at least part of at least one of a network element, a control module, and a computer readable media.

* * * * *